Feb. 1, 1955  G. A. LYON  2,701,037
DETACHABLE WHEEL COOLING MEANS
Filed Nov. 30, 1950  3 Sheets-Sheet 1
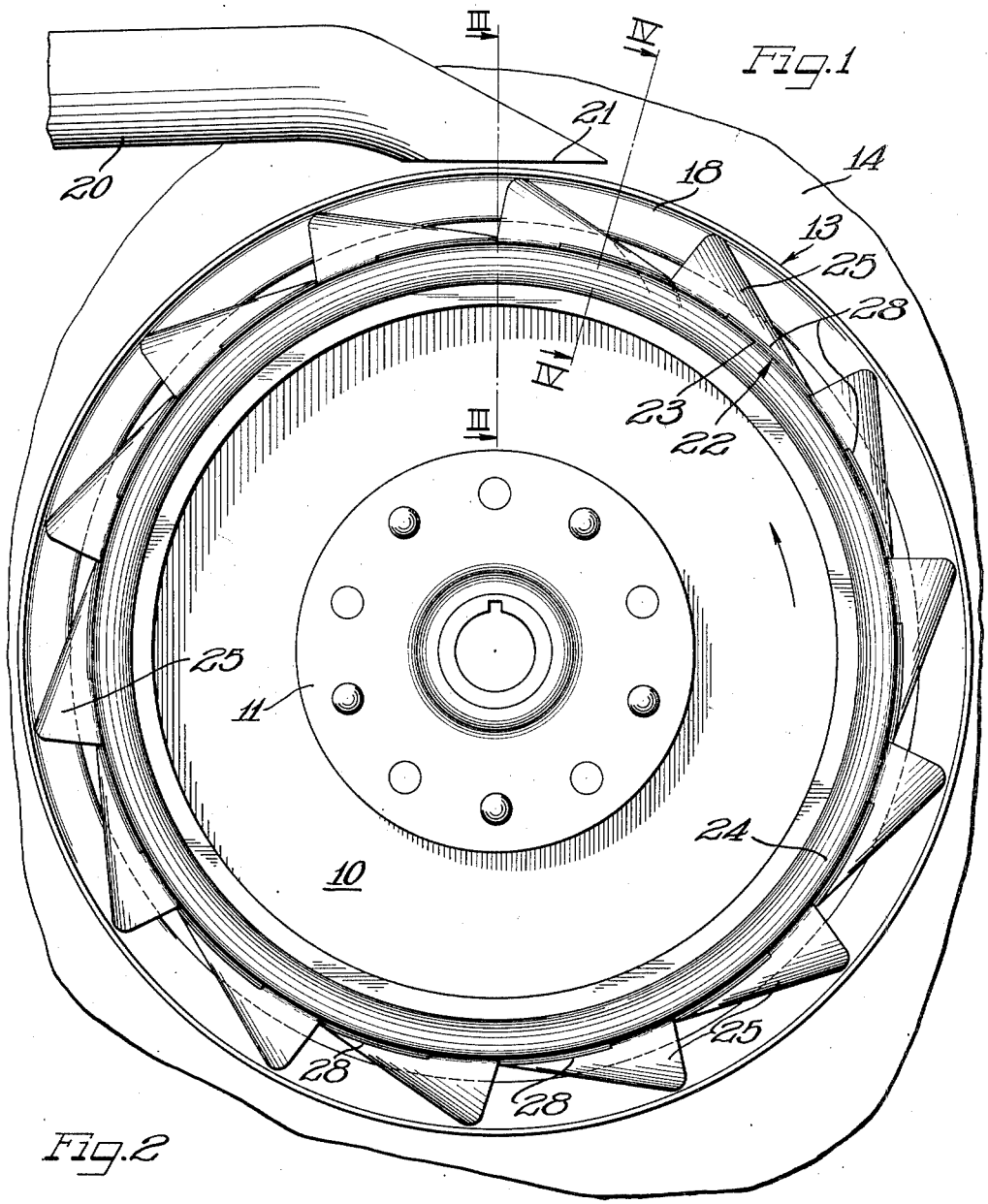
Fig.1
Fig.2
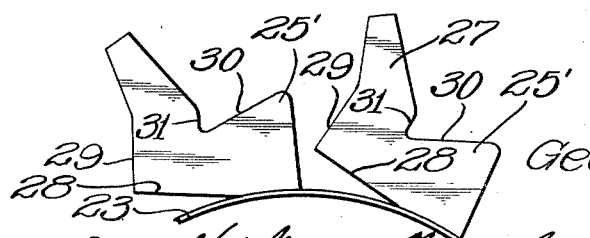
Inventor:
George Albert Lyon
by [signature] Attys

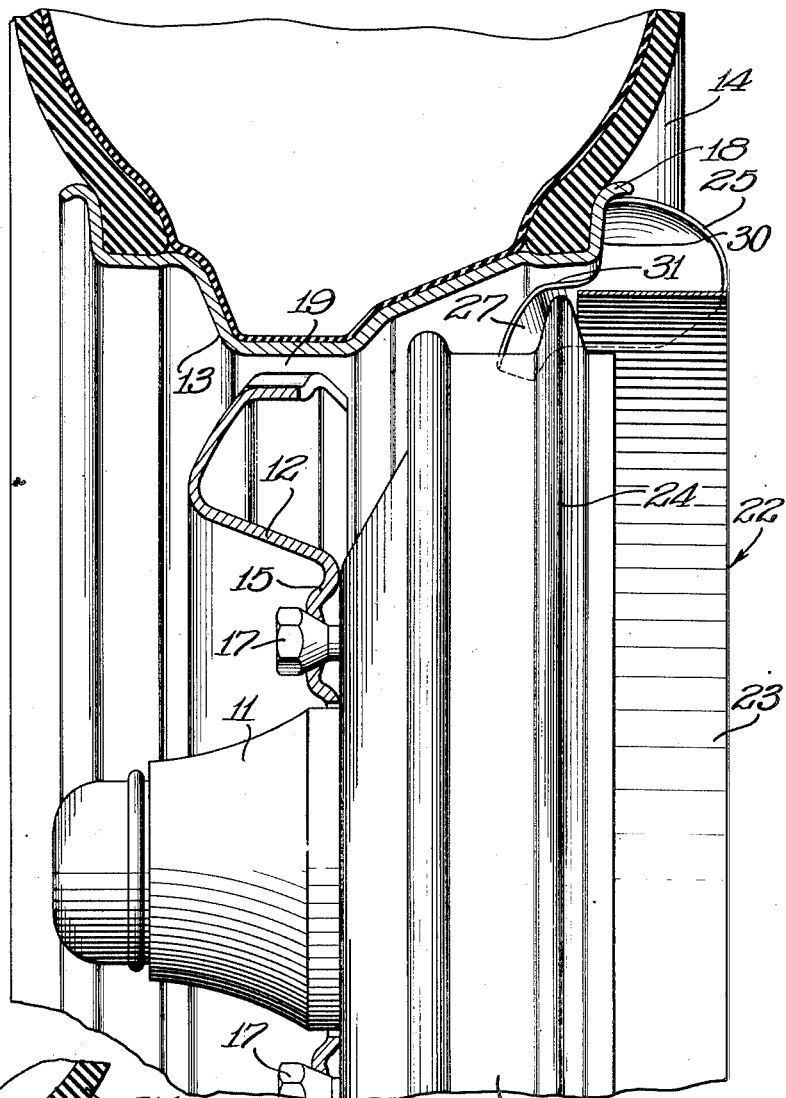
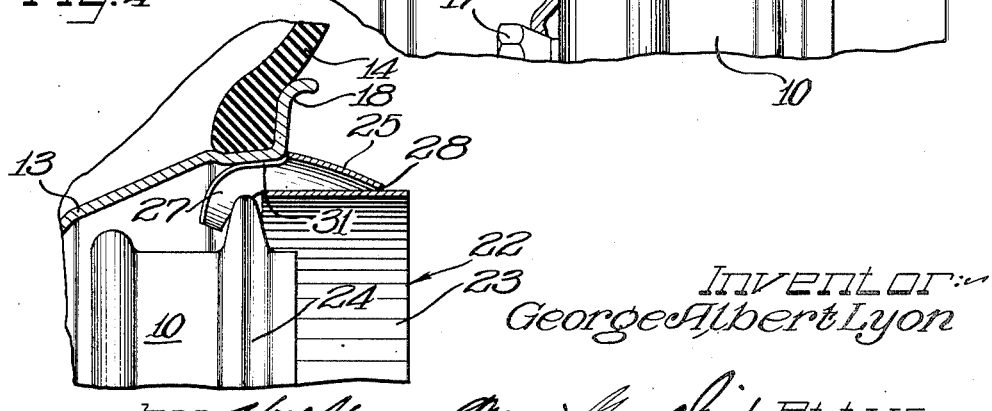

Inventor:
George Albert Lyon
by [signature] Attys

United States Patent Office 2,701,037
Patented Feb. 1, 1955

2,701,037

DETACHABLE WHEEL COOLING MEANS

George Albert Lyon, Detroit, Mich.

Application November 30, 1950, Serial No. 198,413

13 Claims. (Cl. 188—264)

The present invention relates to improvements in the cooling of wheels and more particularly the cooling of the brake drum structure of the wheels of automotive vehicles.

The current trend is toward pneumatic tires of wide tread area and therefore tires of substantial width. Hence the tire rims of the wheels on which the tires are supported must also be of substantial width. Consequently, the brake drum housing associated with an automotive wheel of this kind is entirely surrounded by the tire rim and the tire and virtually isolated from the air stream passing the wheel while running over a roadway. As a result overheating of the brakes is a hazard of increasing importance since by reason of the virtual isolation of the brake drum from the air stream there is inadequate dissipation of heat because of lack of heat transfer to cooling air moving over the brake drum.

It is accordingly an important object of the present invention to provide effective cooling of automotive running wheels and more particularly cooling of the brake drums of such wheels.

Another object of the invention is to provide means for effecting positive circulation of air through vehicle wheels and more especially for cooling the brake drums associated with such wheels.

Another object of the invention is to provide an improved detachable wheel cooling device.

Still another object of the invention is to provide apparatus for directing a greater volume of air in heat-dissipating circulation onto and about a vehicle brake drum than can be derived from the normal air stream passing the wheel while running in service with the vehicle with which associated.

A still further object of the invention is to provide a ring-shaped detachable air circulation promoting accessory for use with a wheel of an automotive vehicle having a brake drum to be cooled by air directed by the accessory.

Yet another object of the invention is to provide a low cost, effective air circulation promoting device to be applied to automotive vehicle wheels.

According to general features of the present invention a vehicle wheel traveling over a roadway and having a brake drum is cooled while running over the roadway by delivering to the upper portion of the wheel air in addition to the air passing the wheel, and driving said air against and past the brake drum.

According to other general features of the invention there is provided in a vehicle wheel assembly including a brake drum, means for delivering air to the upper portion of the wheel, and means for driving said air onto the brake drum in cooling relation thereto.

According to other features of the invention there is provided in a vehicle wheel including a brake drum and a tire rim encircling the brake drum in spaced relation, an air circulation ring member having a series of air directing vanes thereon, and with said vanes retainingly engaging the brake drum to maintain the ring in assembly with the wheel.

According to yet other general features of the invention there is provided for use with a vehicle wheel having a brake drum to be cooled by air circulation, an air circulation promoting ring member comprising a one piece sheet metal structure including an annular body, and a series of tabs extending from one edge of the body and lying across the body and projecting beyond the opposite edge of the body, said tabs defining air scoops and air circulation directing vanes.

Other objects, features and advantages of the present invention will be readily apparent from the following detailed description of a preferred embodiment thereof taken in conjunction with the accompanying drawings, in which:

Figure 1 is an inside elevational view of a wheel assembly including air delivery and circulation-promoting structure embodying the present invention;

Figure 2 is a fragmentary elevational view of a partially formed air circulation promoting ring according to the present invention;

Figure 3 is an enlarged fragmentary diametrical sectional view taken substantially on the line III—III of Fig. 1;

Figure 4 is a fragmentary diametrical sectional view taken substantially on the line IV—IV of Fig. 1;

As shown on the drawings:

Figure 5:
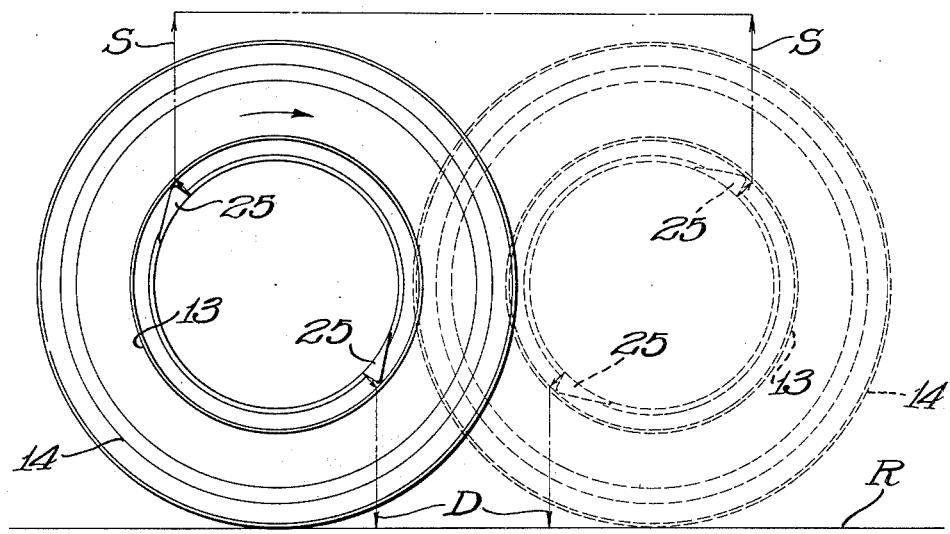
Figure 5 is a schematic view illustrating a relative range of movement of the air scoop vanes of the air circulation promoting device in the travel of a wheel over a roadway.

By way of example, the invention is shown in Figs. 1, 3 and 4 as in use on a vehicle wheel of the kind that may be employed on a automotive vehicle such as a truck or automobile. Such a wheel comprises an assembly including a brake drum 10 of the usual general cup shape carrying an axial flanged hub 11 which is adapted to be keyed onto an axle of a vehicle (not shown).

In addition to serving as a drum providing an internal annular friction surface for engagement by brake shoes of a brake assembly of the vehicle, the brake drum 10 also serves as the supporting medium for a detachable wheel structure including a wheel body 12 which may be of any preferred construction such as a heavy gauge sheet metal stamping peripherally supporting a multi-flange, drop-center tire rim 13 which in turn supports a pneumatic tire and tube assembly 14. At its center the wheel body has a bolt-on flange 15 which is secured detachably to the outer face of the brake drum 10 concentrically about the hub 11 as by means of attachment bolts 17. Through this arrangement the wheel structure including the wheel body 12, the tire rim 13 and the tire and tube assembly 14, as a unit can be attached to or removed from the wheel drum 10 as desired.

In line with the current preference, the tire and tube assembly 14 are of the popular wide-tread-type which requires that the tire be provided with a wide casing, and the tire rim 13, in order to accommodate effectively the wide tire is also of considerable width. In order to minimize the outward projection of the tire rim and tire, the inner portion of the tire rim may, as shown, be somewhat wider, with the result that its inner terminal flange 18 extends inwardly at least as far as and, as shown, slightly beyond the inner edge of the brake drum 10. Then, the inner side wall of the tire 14 projects inwardly even beyond the inner terminal flange 18 of the tire rim. In consequence, the brake drum 10 is entirely surrounded by the inner portion of the tire rim and the tire assembly to such an extent that in the running of the wheel with the associated vehicle the brake drum 10 is substantially isolated or shielded from the air stream which passes the traveling wheel, due to the encompassment of the brake drum by the inwardly projecting portions of the tire rim and the tire assembly. Therefore in spite of the fact that the wheel body 12 is provided about its periphery with a plurality of ventilation openings 19, and the inner portion of the tire rim 13 is spaced radially outwardly from the brake drum 10, adequate ventilation through the wheel, or about the brake drum 10, especially during high speed running operation of the wheel, is not sufficient for adequate cooling of the brake drum.

According to the present invention, cooling air circulation for transferring and dissipating heat from the brake drum 10 is provided for in a manner which will assure thorough and uniform positive driving of cooling air into contact with the entire periphery of the brake drum 10. Air for this purpose is derived from the free air at the inner side of the vehicle wheel and from a supplementary air source. The supplementary air is delivered to a point adjacent the inner side of the gap between the tire rim and the brake drum and is then progressively driven into the gap and against the brake drum in cooling relation thereto and may then escape with the heat transferred thereto from the brake drum zone of the wheel assembly outwardly through the ventilation openings 19 in the wheel. As shown in Fig. 1, the supplementary air may be conveyed from the air source through a duct or pipe 20 to a discharge nozzle 21 having the discharge opening thereof disposed to deliver the air at the upper portion of the inner side of the space or gap between the tire rim and the brake drum, adjacent to the inner terminal flange 18 of the tire rim.

Means for directing the air positively against the brake drum 10 comprise an air scoop and air directing vane ring member 22. In an economical, practical form, the ring member 22 comprises a sheet metal annulus 23 of tubular form and having an internal diameter large enough to pass over an annular radially projecting rib 24 on the brake drum 10 adjacent to its inner edge. On the body annulus 23 of the ring member are a uniform series of air scoops 25 projecting from the radially outer periphery of the body ring and having vane flanges 27 projecting therefrom for directing toward and against the brake drum 10 air scooped into the scoop members 25.

By preference, the air scoops 25 are formed as integral tabs in one piece with the sheet metal body annulus 23. For this purpose, all of the scoop tabs are formed along one edge of the body ring 23 as by stamping or rolling the same from a single strip of sheet material of which the body ring 23 is made. This may be accomplished by effecting the stamping while the material is flat and with the tabs, identified as 25' in Fig. 2 projecting from the common edge of the body ring strip. Then the body ring strip 23 is bent to ring form and the ends secured together as by welding, and the tabs 25' are formed into the desired scoop shape.

Figure 6:
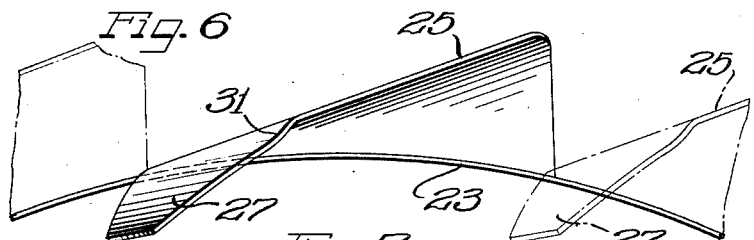
Figure 6 is a fragmentary outer side elevational view of the air circulation promoting ring device of the present invention showing one of the air scoop and vane members thereon.
Figure 7:
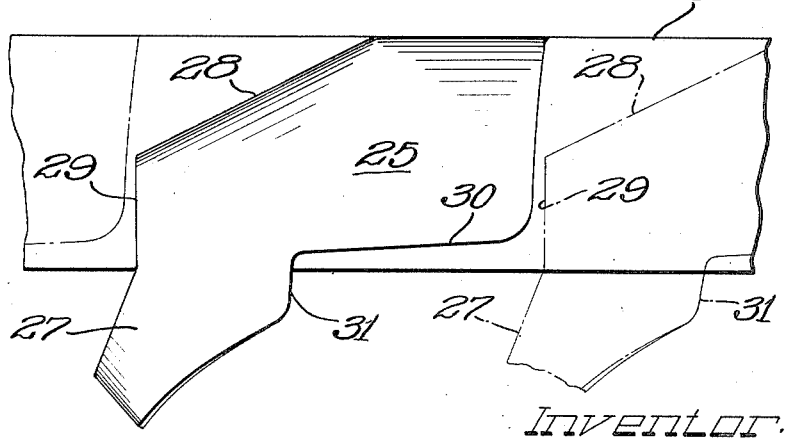
Figure 7 is a top plan view of that portion of the air promoting ring device shown in Fig. 6.

Initially the scoop tabs 25' appear substantially as shown in Fig. 2 with respective generally triangular body portions partially attached at one side to the edge of the body ring and throughout the remainder of such side extending generally tangentially relative to the periphery of the body ring, while the vane extensions 27 project from the opposite side of the portion of the scoop tab bodies which diverge from the body ring. The scoop ring structure is then completed by bending the scoop tabs 25' over the body annulus 23 until the diverging side edge portion identified at 28 and an end edge 29 engage the outer periphery of the body annulus. As a result, as best seen in Figs. 1, 6 and 7, the wider ends of the tabs 25' become scoop mouths while the remainder of the body portions of the tabs slope toward substantially tangential convergence with the outer periphery of the body annulus 23 and assume a transversely arcuate shape. At the same time the vane extensions 27 project substantially beyond the edge of the body annulus 23 opposite to that edge to which the scoop members 25 are attached.

The construction and arrangement of the scoop members 25 and the vane extensions 27 are such that they cooperate with respectively the tire rim 13 and the brake drum 10 to retain the air circulation promoting ring 22 in operative position with the wheel assembly. To this end, the vane extension portions 27 are shaped to curve in general extension of the curvature of the body portions of the scoop members 25 so that the extensions project not only beyond the body annulus 23, but also radially inwardly as best seen in Figs. 4 and 6 and also indicated in dash outline at the top of Fig. 1. Thereby, the air circulation promoting member 22 can be applied to the brake drum 10 before application of the wheel structure thereto, by moving the air circulation ring 22 axially inwardly coaxially about the brake drum 10 until the body annulus 23 passes the brake drum rib 24 and the rear edges of the taillike vane extensions 27 engage retainingly against the axially outer side and on top of the brake drum rib 24. In this manner, the air circulation promoting ring 22 is supported in place on the brake drum.

Unintentional displacement of the air circulation ring 22 from the brake drum 10 is prevented by engagement of the inner terminal flange 18 of the tire rim against a retaining abutment edge 30 directed axially outwardly on each of the respective scoop members 25. The dimensional relationships between the abutment edges 30 and the rear edges of the vane extensions 27 is such that when the tire rim terminal flange 18 is in full engagement with the retaining edges 30, after the wheel structure has been fully attached to the brake drum 10 by attachment of the bolt-on flange 15 to the brake drum by means of the bolts 17, a substantially tensioned, or cramped condition prevails, which places the more or less resilient material of the scoop members 25 under resilient tension by reason of the axially outer shoulder of the rib 24 facing oppositely to and cooperating with the axially inwardly facing shoulder of the tire rim terminal flange 18 to tend to force the incurved inner edge of the vane extensions 27 to slightly greater spacing than originally existed between such rear edge and the corresponding abutment edge 30 of the scoop member. This assures freedom from axial looseness or rattle and also affords a strong frictional gripping interengagement of the parts to retain the ring member 22 against relative turning.

Further frictional interengagement of the vane extensions 27 with the tire rim, and positive retention against relative radial movement or rattle is assured by having the forward edges of the respective vane extensions 27 formed with respective angular shoulders 31 disposed angularly relative to and merging with the scoop body abutment edges 30 and disposed to engage under resilient tensioned gripping frictional contact with the adjacent intermediate flange of the tire rim as best seen in Figs. 3 and 4.

Through this arrangement, also, the portions of the vane extensions 27 including the respective shoulders 31, serve to bridge the gap between the brake drum rib 24 and the adjacent portion of the intermediate flange of the tire rim. Hence, in the forward running of the wheel, air scooped into the air scoops 25 is compelled first by the air scoop members 25 cooperating with the contiguous and underlying portion of the body annulus 23 to move rearwardly and axially outwardly relative to the respective air scoop members, and then by reason of the blocking or bridging of the gap between the brake drum rib 24 and the tire rim by the vane extensions 27 the scooped air is directed axially outwardly as it leaves the trailing converging ends of the air scoop toward the periphery of the brake drum. Since the vane extensions 27 converge both rearwardly in a peripheral sense relative to the brake drum 10 and radially inwardly toward the brake drum periphery, the scooped air is further directed radially inwardly against the brake drum periphery into thorough heat transfer, sweeping, cooling relation to gain maximum cooling value from the air as it travels axially outwardly through the space between the brake drum and the tire rim. The spent air then escapes through the wheel openings 19.

It will be understood, of course, that in the exemplary air circulating scoop ring 22 shown on the drawings, a right hand wheel ring is shown. For a left hand wheel the air scoops 25 will, of course, be directed in the opposite peripheral direction as shown for the right hand wheel.

Removal of the air scoop ring 22 is easily accomplished by reversal of the operation for mounting the same. Namely, the wheel structure is removed from the brake drum by removing the attachment bolts 17 and moving the wheel structure away from the brake drum. This releases the axially outer side of the air scoop ring. The air scoop ring can then be removed by moving it axially outwardly away from the brake drum rib 24.

By preference, the width of the air scoop, circulation-promoting ring 22 is such that in its operative disposition on the wheel assembly the air scoop ring projects axially inwardly beyond the maximum fully inflated axially inward bulge of the side wall of the tire 14. Thereby, as the wheel turns forwardly, air is scooped from the air stream passing the inner side of the wheel and diverted and directed toward and onto the brake drum in cooling relation.

By delivering a positive supply of air to the upper portion of the air scoop ring 22, as by means of the nozzle 21, maximum benefit from such air supply is derived because in the upper area of travel, the air scoops 25 are traveling at their greatest speed with relation to the roadway over which the wheel is traveling. Hence, in effect, the air scoops 25 whip past the nozzle 21 and thereby develop substantial pressure in the scooped air which drives the air forcefully in volume against the brake drum 10 for cooling purposes.

In the schematic showing in Fig. 5 is illustrated the explanation for the relatively greater speed of movement of the air scoops 25 relative to roadway R at the top of the wheel than at any other portion about the wheel. Thus, during the same distance of travel of the wheel over the roadway R, an air scoop 25 at the bottom of the wheel will travel a distance indicated between the arrows D while an air scoop 25 will travel the almost three and one-half times greater distance designated between the arrows S relative to the roadway R. Moreover, the air scoops 25 at the bottom of the wheel are traveling rearwardly, while the air scoops at the top of the wheel are traveling forwardly. As a result not only do the air scoops 25 operate with highest efficiency at the top of the wheel to capture or scoop in air from the air stream passing the forwardly moving wheel, but by reason of whipping past the air supply nozzle 21 drive a large volume of cooling air at high velocity toward and past the perimeter of the brake drum 10. Thereby the present invention attains an exceptionally high brake drum cooling efficiency.

It will be understood that modifications and variations may be effected without departing from the scope of the novel concepts of the present invention.

I claim as my invention:

1. In a wheel assembly including a brake drum and a tire rim encircling the brake drum in spaced relation and defining therewith a gap opening axially inwardly, air discharge means located stationarily axially inwardly from the tire rim adjacent to the upper inner peripheral portion of the brake drum and above said gap, and air capturing and directing means rotating with the wheel and disposed at the axially inner side of said gap to capture air delivered from said air delivery means to drive the air into said gap into cooling sweeping relation to the periphery of the brake drum as the wheel rotates.

2. In a vehicle wheel including a brake drum having a shoulder and a tire rim encircling the brake drum in spaced relation, an air circulation ring member having a series of air directing vanes thereon, and with said vanes retainingly engaging the brake drum shoulder to maintain the ring in assembly with the wheel.

3. In a vehicle wheel including a multi-flanged tire rim and a brake drum substantially encompassed by the tire rim with an air circulation gap between the brake drum and tire rim with respective oppositely directed shoulders on the drum and rim, an air circulation promoting ring member including an annular body disposed at one axial side of the brake drum, and air scoop and air directing members carried by said body and engaging retainingly directly against said shoulders and extending across said gap to direct air into the gap and in cooling relation to the brake drum.

4. In combination with a wheel including a tire rim and a brake drum having an annular radially outwardly projecting rib adjacent its inner edge and defining with the tire rim an air circulation gap, an air promotion ring having air scoop members thereon directly engaging against the axially inner side of the tire rim and having air directing vanes engaging directly against the axially outer side of said rib and being thereby retained in place on the wheel.

5. In a vehicle wheel including a multi-flanged tire rim and a brake drum encompassed by the tire rim and defining therewith an air circulation gap, the brake drum having an axially outwardly facing shoulder and the tire rim having an axially inwardly facing shoulder spaced axially inwardly from the brake drum shoulder, an air circulation promoting rim member disposed at the axially inner side of said wheel and having an annular body of an internal diameter greater than all portions of the brake drum to pass said brake drum axially for assembly purposes, air scoops on said annular body having portions thereof extending to a larger diameter than the body and engaging retainingly against said tire rim shoulder, and air directing vane extensions projecting from said air scoops to a smaller diameter than said body and engaging retainingly against said brake drum shoulder.

6. In a vehicle wheel including a multi-flanged tire rim and a brake drum encompassed by the tire rim and defining therewith an air circulation gap, the brake drum having an axially outwardly facing shoulder and the tire rim having an axially inwardly facing shoulder spaced axially inwardly from the brake drum shoulder, an air circulation promoting ring member disposed at the axially inner side of said wheel and having an annular body of an internal diameter greater than all portions of the brake drum to pass said brake drum axially for assembly purposes, air scoops on said annular body having portions thereof extending to a larger diameter than the body and engaging retainingly against said tire rim shoulder, and air directing vane extensions projecting from said air scoops to a smaller diameter than said body and engaging retainingly against said brake drum shoulder, said air scoops and said vane extensions being of resilient material and being retained under resilient cramped tension by said shoulders to avoid rattling and to hold the air circulation ring member against rotation relative to the wheel.

7. For use with a vehicle wheel having a brake drum to be cooled by air circulation, an air circulation promoting ring member comprising a one piece sheet metal structure including an annular body, and a series of tabs extending from one edge of the body and bent over to lie across the body and projecting beyond the opposite edge of the body, said tabs defining air scoops and air circulation directing vanes.

8. In a brake drum air circulation promoting ring member, a tubular body annulus, a series of equally spaced air scoop members carried by the outer periphery of said annulus, said scoop members having tail-like lateral vane extensions projecting beyond an edge of the body annulus for engaging between a brake drum and an associated tire rim.

9. In a brake drum air circulation promoting ring member, a tubular body annulus, a series of equally spaced air scoop members carried by the outer periphery of said annulus, said scoop members having tail-like lateral vane extensions for engaging between a brake drum and an associated tire rim, said annulus and said air scoop members all being formed from one piece of sheet metal with the air scoop members bent over from one edge of the annulus and extending across the outer periphery of the annulus and the vane extensions projecting beyond the remaining edge of the annulus.

10. In an air circulation promoting ring for detachable mounting at the inner side of the gap between a tire rim and a brake drum of a vehicle wheel, a body annulus, air scoops on the outer periphery of said annulus, and vane extensions projecting beyond one edge of said annulus, said air scoops having portions thereof for retaining engagement with the tire rim and said vane extensions being tilted relative to one another and to the periphery of the ring and having edge portions thereof for retaining engagement with the brake drum for retaining the ring in place.

11. In a vehicle assembly, a running wheel having a brake drum, air delivery means including a nozzle discharging a stream of air adjacent to the upper portion of the periphery of the brake drum in a generally radially inward direction toward the axis of and axially inwardly from the brake drum, and air impelling means attached to and running with the brake drum and reaching into the stream of air from the nozzle for impelling the air delivered by the nozzle axially outwardly in cooling relation over the brake drum.

12. In an annular air scoop ring for use with a vehicle wheel at the inner side of the gap between a brake drum and an encompassing tire rim, a tubular body annulus having axially inner and outer ends, and a series of uniformly spaced air scoop vane tabs extending from the axially inner end of the body annulus and thereacross with a rearwardly directed side edge on the tabs engaging the body annulus and a forwardly directed side edge on the tabs spaced from the annulus, said tabs having vane extension portions projecting generally axially and radially beyond the axially outer end of the annulus.

13. In a vehicle wheel including a multi-flange tire rim and a brake drum generally encompassed by the tire rim and defining therewith an air circulation gap opening toward the axially inner side of the wheel, an air circulation promoting ring member for effecting brake drum cooling air circulation through said gap, said ring member having an annular tubular body extending axially and of a diameter to lie adjacent the brake drum at the radially inner side of said gap and project axially inwardly therefrom, and a circumferentially spaced series of air directing members on said tubular body at the axially inner portion thereof having wall portions extending generally radially outwardly across said gap and having radially outer marginal portions thereon extending axially outwardly for direct opposition to the tire rim at the radially outer side of said gap, said wall portions being of substantial length and sloping obliquely in one circumferential direction so as to provide flaringly open mouths at one end of the air directing members and tail portions axially outwardly offset from the mouth portions toward the tire rim, whereby each of the air directing members provides an air impeller vane structure extending obliquely relative to the tire rim and the tubular ring body and with the scoop-like mouth thereof opening in one circumferential direction axially inwardly from said gap and the tail portion thereof projecting toward the mouth of said gap.

References Cited in the file of this patent

UNITED STATES PATENTS

| | | |
|---|---|---|
| 1,665,437 | Booth | Apr. 10, 1928 |
| 1,874,625 | Rice | Aug. 30, 1932 |
| 1,881,002 | Udale | Oct. 4, 1932 |
| 2,105,176 | Ash | Jan. 11, 1938 |
| 2,136,472 | Sinclair | Nov. 15, 1938 |
| 2,143,950 | Kliesrath | Jan. 17, 1939 |
| 2,248,684 | Levy | July 8, 1941 |
| 2,248,707 | Horn | July 8, 1941 |
| 2,265,938 | Eksergian | Dec. 9, 1941 |
| 2,489,522 | Chase | Nov. 29, 1949 |
| 2,568,759 | Page | Sept. 25, 1951 |

FOREIGN PATENTS

| | | |
|---|---|---|
| 779,937 | France | Apr. 16, 1935 |
| 229,889 | Great Britain | Mar. 5, 1925 |
| 338,237 | Germany | July 18, 1921 |